(12) United States Patent
Shih et al.

(10) Patent No.: US 7,385,512 B2
(45) Date of Patent: Jun. 10, 2008

(54) FLEXIBLE RADIO FREQUENCY IDENTIFICATION LABEL AND METHOD FOR FABRICATING THE SAME

(75) Inventors: Chin-Ming Shih, Hsinchu Hsien (TW); Pin-Chao Hsu, Hsinchu (TW); Ya-Ping Chen, Hsinchu (TW); John D. H. Mai, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 117 days.

(21) Appl. No.: 11/311,293

(22) Filed: Dec. 20, 2005

(65) Prior Publication Data

US 2007/0069899 A1 Mar. 29, 2007

(30) Foreign Application Priority Data

Sep. 26, 2005 (TW) .................................. 94133302

(51) Int. Cl.
*G08B 13/14* (2006.01)
*G06K 19/06* (2006.01)

(52) U.S. Cl. ............................... 340/572.7; 340/572.8; 235/492

(58) Field of Classification Search .. 340/568.1–572.9; 235/492
See application file for complete search history.

(56) References Cited

U.S. PATENT DOCUMENTS

| 5,859,587 | A | * | 1/1999 | Alicot et al. ............. 340/572.8 |
| 5,982,284 | A | * | 11/1999 | Baldwin et al. .......... 340/572.8 |
| 6,031,459 | A | * | 2/2000 | Lake ........................ 340/572.8 |
| 6,094,138 | A | | 7/2000 | Eberhardt et al. ........ 340/572.1 |
| 6,114,962 | A | * | 9/2000 | Wiklof et al. ............. 340/572.8 |
| 6,262,692 | B1 | | 7/2001 | Babb .......................... 343/895 |
| 6,275,156 | B1 | | 8/2001 | Rasband .................. 340/572.1 |
| 6,429,831 | B2 | | 8/2002 | Babb .......................... 343/895 |
| 6,667,092 | B1 | * | 12/2003 | Brollier et al. ............. 428/182 |
| 7,049,962 | B2 | * | 5/2006 | Atherton et al. ......... 340/572.1 |
| 2002/0140558 | A1 | * | 10/2002 | Lian et al. ............... 340/572.8 |
| 2003/0226899 | A1 | * | 12/2003 | Finkelstein ................. 235/492 |

FOREIGN PATENT DOCUMENTS

EP        1 521 208 A1 *   4/2005

* cited by examiner

*Primary Examiner*—George A Bugg
*Assistant Examiner*—Jennifer A Mehmood
(74) *Attorney, Agent, or Firm*—Rabin & Berdo, P.C.

(57) ABSTRACT

A flexible radio frequency identification label and a method for fabricating the same are proposed. A first flexible protection layer is attached to a second flexible protection layer to form a closed space for receiving a radio frequency identification circuit. By such arrangement, a good flexibility can be provided by the flexible protection layers, and the closed space also enables the radio frequency identification circuit to be protected and isolated from the moisture in the outside environment, such that the circuit can be prevented from being oxidized and the service life of the product can be extended.

11 Claims, 5 Drawing Sheets

FLEXIBLE RADIO FREQUENCY IDENTIFICATION LABEL AND METHOD FOR FABRICATING THE SAME

FIELD OF THE INVENTION

The present invention relates to radio frequency identification (RFID) labels and methods for fabricating the same, and more particularly, to a flexible RFID label and a method for fabricating the flexible RFID label.

BACKGROUND OF THE INVENTION

A radio frequency identification (RFID) label uses wireless data acquisition to identify and manage products. Because of a broad range of application, it is imperative to focus on ways to develop a radio frequency identification label, which enables mass production without being limited in its application. U.S. Pat. Nos. 6,262,692B1, 6,429,831, 6,275,156 and 6,094,138 have disclosed relevant radio frequency identification labels to meet its broad application.

U.S. Pat. Nos. 6,262,692B1 and 6,429,831 have disclosed a radio frequency identification label having a multi-layered structure which comprises an antenna, a chip and a circuit connecting the antenna and the chip. Referring to a prior-art radio frequency identification label 1 shown in FIG. 1, a chip 10 and an antenna 11 are encapsulated in a multi-layered structure having a plurality of laminations 12, wherein each of the laminations 12 is provided with an opening 121 for receiving the chip 10. The radio frequency identification label 1 is more cost-effective when comparing to other prior-art radio frequency identification labels as it does not require the use of expensive substrates. However, it does not meet the requirement of miniaturization as its overall thickness is increased by its multi-layer design. Furthermore, the increased thickness would also influence the flexibility of the radio frequency identification label 1, so that the radio frequency identification label 1 cannot be effectively applied to an object having an uneven surface.

Referring to FIG. 2, U.S. Pat. No. 6,275,156 has disclosed a radio frequency identification label 2 in which an antenna 20 and a radio frequency identification circuit (such as a printed circuit or a chip, not shown in the figure) are interposed between an upper lamination 21 and a lower lamination 22. Although the overall thickness can be decreased and the structure can be simplified, the height of the antenna 20 and the radio frequency identification circuit would roughen the surface of the radio frequency identification label 2, so that surface prints or other labels cannot be provided. Moreover, a gap of certain size is formed between the upper lamination 21 and the lower lamination 22. When being used in a flexible condition or applied to an object having an uneven surface, the gap can be easily expanded, so that the moisture-proof effect and the reliability of products are adversely influenced as a consequence. Additionally, the maintenance of the surface flatness and the inclusion of the upper lamination 21 and the lower lamination 22 result in an increase in the overall thickness of the radio frequency identification label 2, such that the flexibility of the label is decreased, resulting in limitation of application.

U.S. Pat. No. 6,094,138 has disclosed a radio frequency identification label, which is different from other prior-art radio frequency identification labels in terms of structures. Referring to FIG. 3, a radio frequency identification label 3 employs a flexible substrate 30 having an opening 300 penetrating therethrough, such that an integrated circuit 31 is received in the opening 300 of the substrate 30. Then, an antenna 32 is formed on the substrate 30 by spray printing. A conductive material 33 is subsequently interposed between the integrated circuit 31 and the antenna 32, so as to electrically connect the integrated circuit 31 to the antenna 32. As the integrated circuit 31 is received in the substrate 30, the overall thickness of the radio frequency identification label 3 is effectively reduced. Further, as the flexible substrate that is good in flexibility is used, the radio frequency identification label 3 can be applied to an object having an uneven surface. However, such radio frequency identification label 3 is also disadvantageous as it provides no protective or moisture-proof design. Moreover, as the conductive material 33 is interposed between the integrated circuit 31 and the antenna 32, the surface flatness cannot be easily maintained, so that surface prints or other labels cannot be provided.

Accordingly, the problem to be solved here is to provide a flexible radio frequency identification label and a method for fabricating the same, by which drawbacks occurred in the prior-art radio frequency identification labels can be eliminated, including high expenses, unreliable products due to oxidation caused by moisture, and an uneven surface.

SUMMARY OF THE INVENTION

In light of the above prior-art drawbacks, a primary objective of the present invention is to provide a flexible radio frequency identification label and a method for fabricating the same, by which the moisture-proof effect and protection of products can be improved.

Another objective of the present invention is to provide a flexible radio frequency identification label and a method for fabricating the same, by which a surface with satisfied flatness can be provided.

Still another objective of the present invention is to provide a flexible radio frequency identification label and a method for fabricating the same, by which a simple fabrication method is provided.

A further objective of the present invention is to provide a flexible radio frequency identification label and a method for fabricating the same, by which the cost can be minimized.

A further objective of the present invention is to provide a flexible radio frequency identification label and a method for fabricating the same, by which the service life of products can be extended.

In accordance with the above and other objectives, the present invention proposes a flexible radio frequency identification label, comprising a first flexible protection layer and a second flexible protection layer, which are attached to each other to form a closed space therebetween; a radio frequency identification circuit formed in the closed space; and a miniaturized antenna interposed between the first and second flexible protection layers and electrically connected to the radio frequency identification circuit.

The foregoing radio frequency identification circuit can be a chip or a printed circuit structure formed on one surface of the closed space. The miniaturized antenna can be a printed circuit structure formed on one of corresponding attaching surfaces of the first and second flexible protection layers. The first and second flexible protection layers can be flexible substrates having dielectricity. Further, the radio frequency identification circuit and the miniaturized antenna are electrically connected by the means of a printed circuit.

In a preferred embodiment, a groove is formed on one of corresponding attaching surfaces of the first and second flexible protection layers. Thus, after the first and second flexible protection layers are attached to each other, the closed space can be formed by the means of the groove.

In another preferred embodiment, corresponding attaching surfaces of both the first and second flexible protection layers can be provided with grooves. Thus, after the first and second flexible protection layers are attached to each other, the closed space can be formed by the means of the two corresponded grooves.

In a further preferred embodiment, a middle layer having a hollow portion can be interposed between the first and second flexible protection layers. Thus, after the first and second flexible protection layers are attached to the middle layer, the closed space can be formed by the means of the hollow portion.

The present invention also proposes a method for fabricating the flexible radio frequency identification label. Firstly, a first flexible protection layer and a second flexible protection layer are provided, the second flexible protection layer having a groove on a surface thereof. Then, a radio frequency identification circuit and a miniaturized antenna are formed on a surface of the first flexible protection layer and are electrically connected to each other. Subsequently, the second flexible protection layer is covered on the first flexible protection layer, such that the radio frequency identification circuit is received correspondingly in the groove. Lastly, the first and second flexible protection layers are attached to each other, such that a closed space is formed by the means of the groove for receiving the radio frequency identification circuit. More preferably, the radio frequency identification circuit and the miniaturized antenna electrically connected to each other can be formed on a surface of the first flexible protection layer by spray printing. The first and second flexible protection layers can be attached to each other by thermal pressing and curing. A plurality of grooves arranged at intervals can be provided on the surface of the second flexible protection layer.

The present invention also proposes another method for fabricating the flexible radio frequency identification label. Firstly, a first flexible protection layer and a second flexible protection layer are provided, the second flexible protection layer having a groove on a surface thereof. Then, a radio frequency identification circuit and a miniaturized antenna electrically connected to each other are formed on the surface of the second flexible protection layer, and the radio frequency identification circuit is correspondingly received in the groove. Subsequently, the first flexible protection layer is covered on the second flexible protection layer. Lastly, the first and second flexible protection layers are attached to each other, such that a closed space is formed by the means of the groove for receiving the radio frequency identification circuit. More preferably, the radio frequency identification circuit and the miniaturized antenna electrically connected to each other can be formed on a surface of the first flexible protection layer by spray printing. The first and second flexible protection layers can be attached to each other by thermal pressing and curing. A plurality of grooves arranged at intervals can be provided on the surface of the second flexible protection layer.

The present invention also proposes another method for fabricating the flexible radio frequency identification label. Firstly, a first flexible protection layer, a second flexible protection layer, and a middle layer having a hollow portion formed on a surface thereof are provided. Then, a radio frequency identification circuit and a miniaturized antenna electrically connected to each other are formed on a surface of the first flexible protection layer. Subsequently, the middle layer is covered on the first flexible protection layer, such that the radio frequency identification circuit is correspondingly located in the hollow portion. Afterwards, the second flexible protection layer is also covered on the middle layer. Lastly, the first and second flexible protection layers are attached to the middle layer, such that a closed space is formed by the means of the hollow portion for receiving the radio frequency identification circuit. More preferably, the radio frequency identification circuit and the miniaturized antenna electrically connected to each other can be formed on the surface of the first flexible protection layer by spray printing. The first and second flexible protection layers can be attached to the middle layer by thermal pressing and cuing. A plurality of hollow portions arranged at intervals can be provided on the surface of the middle layer.

When comparing to the prior-art, the flexible radio frequency identification label proposed in the present invention encapsulates the radio frequency identification circuit such as a chip or a printed circuit structure in the closed space. Thus, the radio frequency identification circuit can be completely protected and prevented from being oxidized due to moisture in the outside environment. In other words, the moisture-proof effect and protection of products can be improved to increase the product reliability and extend the service life of the product. As a flexible protection layer is used instead of a multi-layered structure, the overall radio frequency identification label is miniaturized and is able to maintain good flexibility. Thus, a sequence of fabrication processes can be easily performed and the radio frequency identification label can be applied to an object with an uneven surface. Moreover, as the structure such as the groove is located inside the flexible radio frequency identification label, surface flatness can be ensured to allow surface prints or other labels. Additionally, as the radio frequency identification circuit can be a printed circuit structure received in the closed space, prior-art processes such as dispensing and preheating can be eliminated, such that the fabrication method can be simplified to reduce production costs.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

Preferred embodiments of a flexible radio frequency identification label and a method for fabricating the same proposed in the present invention are described as follows with reference to FIGS. 4 to 6. It should be noted that the drawings are simplified schematic diagrams and only illustrate components/elements relevant to the present invention. In practice, the arrangement of components/elements may be more complex.

First Embodiment

Figure 1:
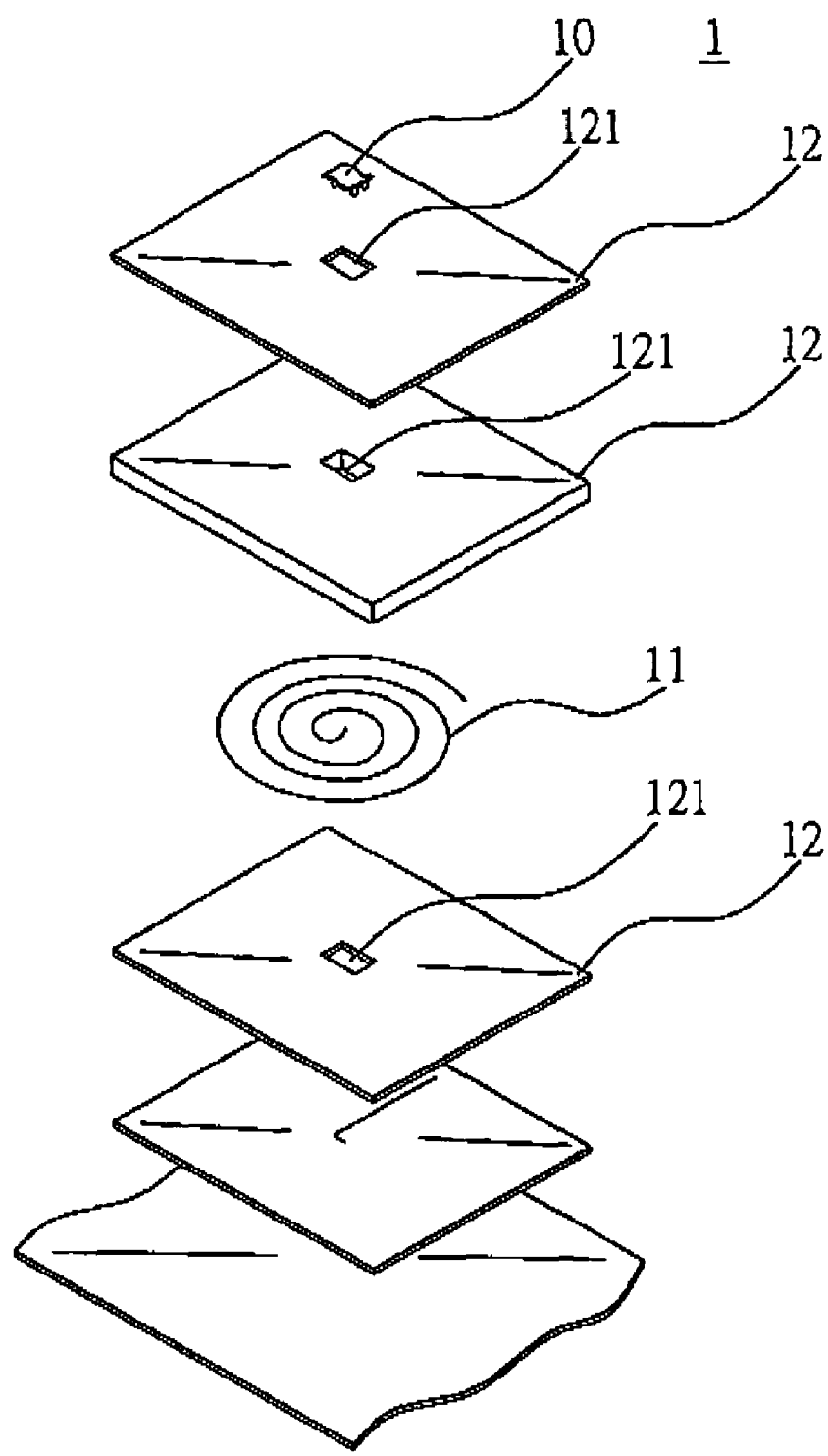
FIG. 1 (PRIOR ART) is a schematic diagram of a conventional radio frequency identification label according to U.S. Pat. Nos. 6,262,692B1 and 6,429,831.
Figure 2:
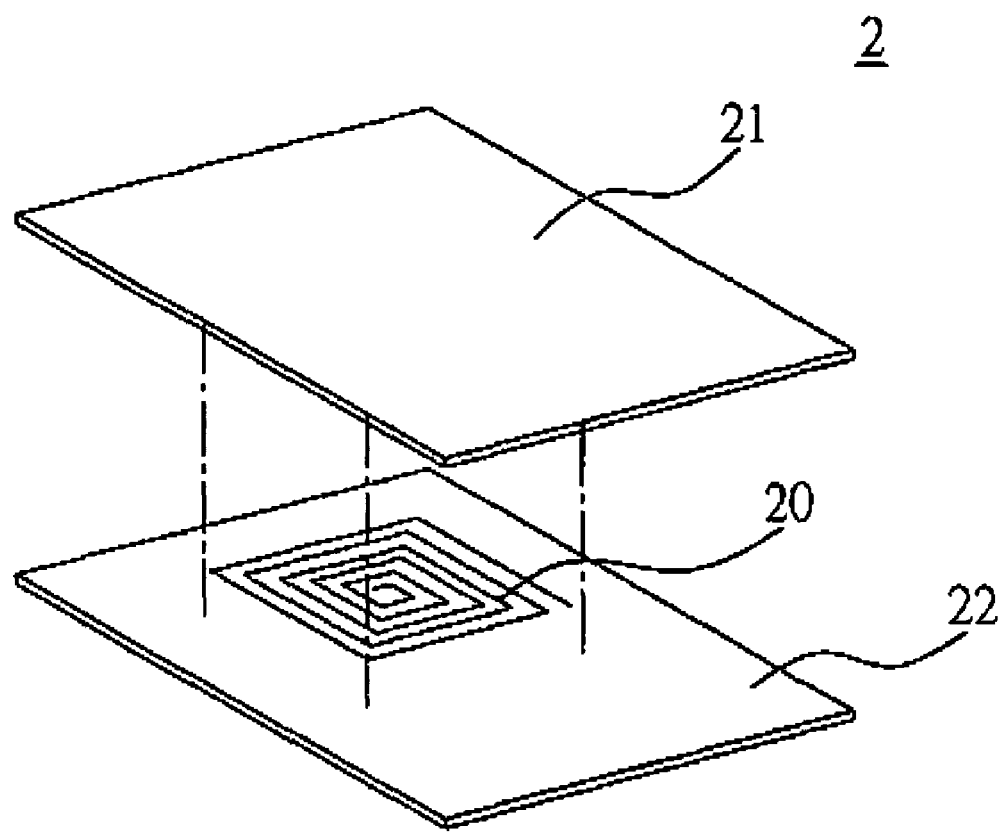
FIG. 2 (PRIOR ART) is a schematic diagram of a conventional radio frequency identification label according to U.S. Pat. No. 6,275,156.
Figure 3:
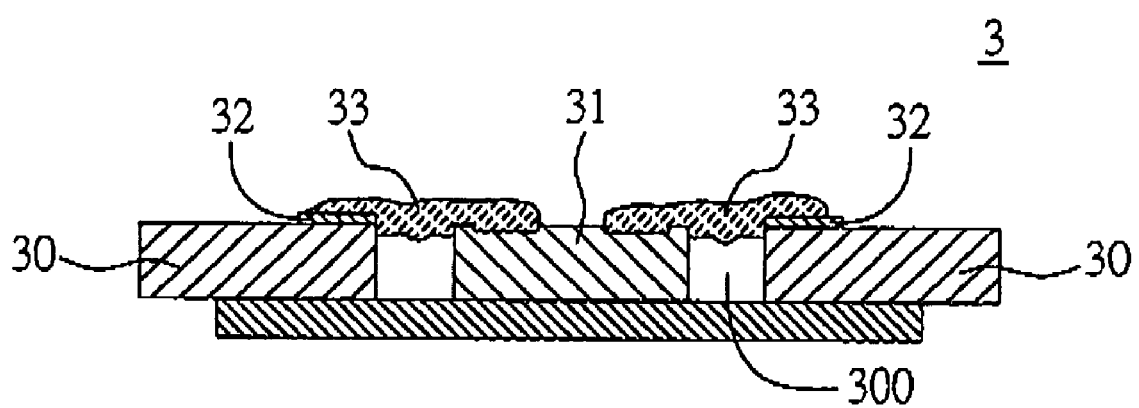
FIG. 3 (PRIOR ART) is a schematic diagram of a conventional radio frequency identification label according to U.S. Pat. No. 6,094,138.
Figure 4A:
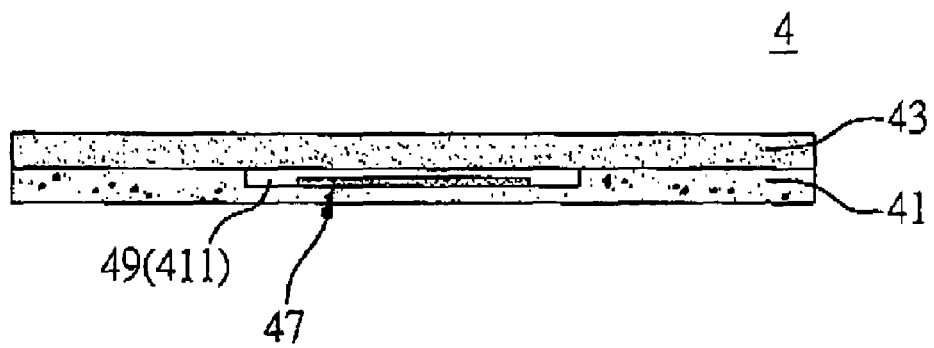
FIGS. 4A and 4B are respectively a cross-sectional view and a structurally exploded view of a flexible radio frequency identification label according to a first embodiment of the present invention.

FIG. 4 is a diagram of a flexible radio frequency identification label according to the first embodiment of the present invention. Referring to FIG. 4, a flexible radio frequency identification label 4 comprises a first flexible protection layer 43, a second flexible protection layer 41, a miniaturized antenna 45 and a radio frequency identification circuit 47. The first flexible protection layer 43 is attached to the second flexible protection layer 41 to form a closed space 49 therebetween. The radio frequency identification circuit 47 is received in the closed space 49. Also, the miniaturized antenna 45 is interposed between the first flexible protection layer 43 and the second flexible protection layer 41 and electrically connected to the radio frequency identification circuit 47.

The first flexible protection layer 43 and the second flexible protection layer 41 can be flexible substrates having dielectricity, and can be a flat structure made of the same or different materials. The miniaturized antenna 45 can be a printed circuit structure formed on one of corresponding attaching surfaces of the first flexible protection layer 43 and the second flexible protection layer 41. Further, the radio frequency identification circuit 47 can be a chip or a printed circuit structure formed on a bottom surface of the closed space 49. The radio frequency identification circuit 47 is electrically connected to the miniaturized antenna 45 by the means of a printed circuit 451.

Figure 4B:
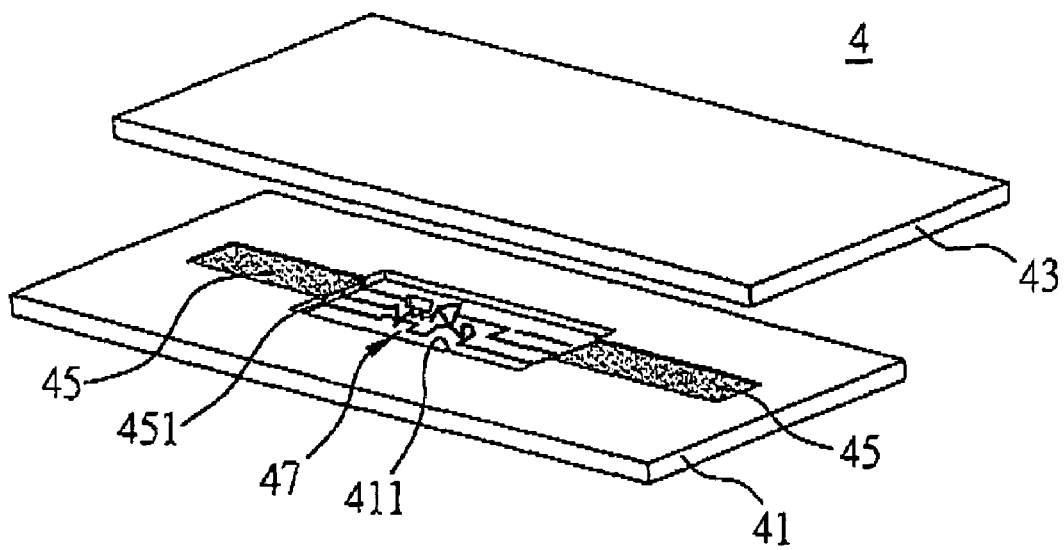

In the present embodiment, referring to the closed space 49 formed between the first flexible protection layer 43 and the second flexible protection layer 41, a groove 411 is provided on a top surface of the second flexible protection layer 43 (as shown in FIG. 4B). Thus, after the first flexible protection layer 43 is attached to the second flexible protection layer 41, the closed space 49 is formed by the means of the groove 411. Furthermore, the radio frequency identification circuit 47 can be formed on a surface of the groove 411 by spray printing. The miniaturized antenna 45 and the printed circuit 451 can be fabricated simultaneously. Additionally, the first flexible protection layer 43 and the second flexible protection layer 41 can be attached by thermal pressing, such that the closed space 49 is formed by the means of the groove 411.

The steps of fabricating the flexible radio frequency identification label 4 in the present embodiment comprise:
a) providing a first flexible protection layer 43 and a second flexible protection layer 41, the second flexible protection layer 41 having a groove 411 on a surface thereof;
b) forming a radio frequency identification circuit 47, a miniaturized antenna 45 and a printed circuit 451 which are electrically connected to each other on the surface of the second flexible protection layer 41, wherein the radio frequency identification circuit 47 is correspondingly located in the groove 411;
c) covering the first flexible protection layer 43 on the second flexible protection layer 41; and
d) attaching the first flexible protection layer 43 to the second flexible protection layer 41, such that a closed space 49 is formed by the means of the groove 411 for receiving the radio frequency identification circuit 47.

Referring to the foregoing steps, the radio frequency identification circuit 47, the miniaturized antenna 45 and the printed circuit 451 which are electrically connected to each other can be formed on the surface of the second flexible protection layer 41 by spray printing. Further, the first flexible protection layer 43 can be attached to the second flexible protection layer 41 by thermal pressing technique. The subsequence steps can also include processes such as curing by cooling or testing. These processes can be easily understood by those skilled in the pertinent art and thus will not be further described in this specification.

Furthermore, a single flexible radio frequency identification label 4 serves as an example to provide description for the present embodiment. However, one skilled in the pertinent art is able to fabricate it using a tape flexible substrate. In other words, a tape second flexible protection layer 41 can be provided with a plurality of grooves 411 arranged at intervals, and a second flexible protection layer 43 can be provided with an even surface before being transmitted to corresponding workstations for subsequent processes.

When comparing to the prior-art, the flexible radio frequency identification label proposed in the present invention encapsulates the radio frequency identification circuit such as a chip or a printed circuit structure in the closed space. Thus, the radio frequency identification circuit can be completely protected and prevented from being oxidized due to moisture in the outside environment. In other words, the moisture-proof effect and protection of products can be improved to increase the product reliability and extend the service life of the product. As a flexible protection layer is used instead of a multi-layered structure, the overall radio frequency identification label is miniaturized and is able to maintain good flexibility. Thus, a sequence of fabrication processes can be easily performed and the radio frequency identification label can be applied to an object with an uneven surface. Moreover, as the structure such as the groove is located inside the flexible radio frequency identification label, surface flatness can be ensured to allow surface prints or other labels. Additionally, as the radio frequency identification circuit can be a printed circuit structure received in the closed space, prior-art processes such as dispensing and preheating can be eliminated, such that the fabrication method can be simplified to reduce production costs.

Second Embodiment

Figure 5:
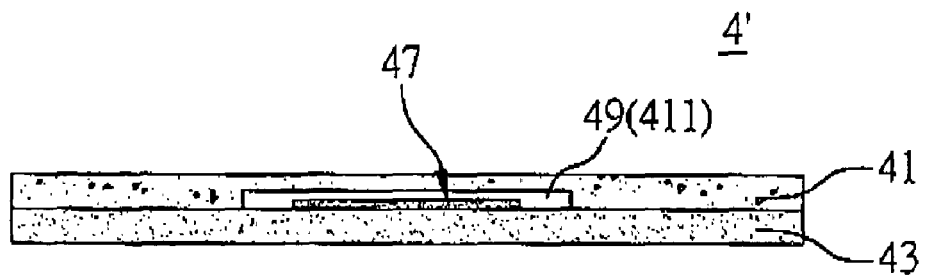
FIG. 5 is a diagram of a flexible radio frequency identification label according to a second embodiment of the present invention.

FIG. 5 is a diagram of a flexible radio frequency identification label according to the second embodiment of the present invention. As the present embodiment and the first embodiment only differ in the structural design of the closed space, in order to provide a succinct specification, the symbols of the same elements are remained unchanged and detailed description of the same structure and fabrication are omitted.

Referring to FIG. 5, a flexible radio frequency identification label 4' comprises a first flexible protection layer 43, a second flexible protection layer 41, and a radio frequency identification circuit 47. The first flexible protection layer 43 is attached to the second flexible protection layer 41 to form a closed space 49 therebetween. The radio frequency identification circuit 47 is received in the closed space 49. As the miniaturized antenna is extreme small in size and interposed between the first flexible protection layer 43 and the second flexible protection layer 41, it is difficult to be labeled and indicated in the diagram. It should be noted that its structure is the same as the one in the first embodiment, and it is also electrically connected to the radio frequency identification circuit 47 in the present embodiment.

The present embodiment mainly differs from the first embodiment in the positions of the first flexible protection layer 43 and the second flexible protection layer 41. In the present embodiment, the second flexible protection layer 41 is covered on the first flexible protection layer 43, such that the groove 411 correspondingly covers the radio frequency identification circuit 47. Similarly, after the first flexible protection layer 43 is attached to the second flexible protection layer 41, the closed space 49 is formed by the means of the groove 411.

The steps of fabricating the flexible radio frequency identification label 4' in the present embodiment comprise:
a) providing a first flexible protection layer 43 and a second flexible protection layer 41, the second flexible protection layer 41 having a groove 411 on a surface thereof;
b) forming a radio frequency identification circuit 47, a miniaturized antenna and a printed circuit (not shown in the figure) which are electrically connected to each other on a surface of the first flexible protection layer 43;
c) covering the second flexible protection layer 41 on the first flexible protection layer 43, such that the radio frequency identification circuit 47 is received in the groove 411; and
d) attaching the first flexible protection layer 43 to the second flexible protection layer 41, such that a closed space 49 is formed by the means of the groove 411 for receiving the radio frequency identification circuit 47.

Referring to the foregoing steps, the radio frequency identification circuit 47, the miniaturized antenna and the printed circuit (not shown in the figure) electrically connected to each other are formed on the surface of the second flexible protection layer 41 by spray printing. Further, the first flexible protection layer 43 is attached to the second flexible protection layer 41 by thermal pressing technique. The subsequence steps can also include processes such as curing by cooling or testing. Alternatively, a tape second flexible protection layer 41 can be provided with a plurality of grooves 411 arranged at intervals, and a second flexible protection layer 43 can be provided with an even surface before being transmitted to corresponding workstations for subsequent processes. These processes can be easily understood by those skilled in the pertinent art and thus will not be further described.

Furthermore, in other embodiments, apart from modifying the positions of the first flexible protection layer 43 and the second flexible protection layer 41, both flexible protection layers can be the second flexible protection layers 41. Thus, the closed space is formed by the means of the two corresponding grooves. In other words, two of the second flexible protection layer 41 with the same structure can be used to fabricate the radio frequency identification label proposed in the present invention, so as to simplify the processes of material management.

Third Embodiment

Figure 6:
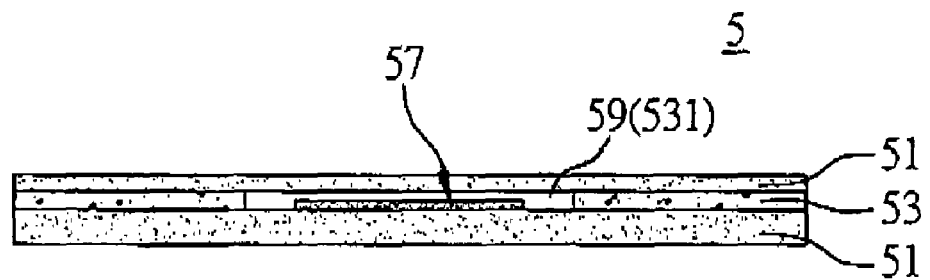
FIG. 6 is a diagram of a flexible radio frequency identification label according to a third embodiment of the present invention.

FIG. 6 is a diagram of a flexible radio frequency identification label according to the third embodiment of the present invention. Referring to FIG. 6, a flexible radio frequency identification label 5 comprises two flexible protection layers 51, a middle layer 53 having a hollow portion 531, a miniaturized antenna (not shown in the figure) and a radio frequency identification circuit 57. The two flexible protection layers 51 are attached to the middle layer 53 to form a closed space 59 therebetween. The radio frequency identification circuit 57 is received in the closed space 59. As the miniaturized antenna is extreme small in size and interposed between the two flexible protection layers 51, it is difficult to be labeled and indicated in the figure. It should be noted that its structure is the same as the one in the first embodiment, and it is also electrically connected to the radio frequency identification circuit 57 in the present embodiment.

The present embodiment mainly differs from the first embodiment in terms of the structure of the closed space 59. The closed space 59 in the present embodiment is formed by the means of the hollow portion 531 of the middle layer 53 rather than the structure of the flexible protection layer 51. The middle layer 53 is interposed between the two flexible protection layers 51, such that the hollow portion 531 correspondingly covers the radio frequency identification circuit 57. Moreover, after the two flexible protection layers 51 are attached to the middle layer 53, the closed space 59 is formed by the means of the hollow portion 531. The two flexible protection layers 51 can be flexible substrates with a flat structure. Actually, it is consistent with the first flexible protection layer 43 described in the first embodiment.

The steps of fabricating the flexible radio frequency identification label 5 in the present embodiment comprise:
a) providing two flexible protection layers 51 and a middle layer 53, the middle layer 53 having a hollow portion 531 on a surface thereof;
b) forming a radio frequency identification circuit 57, a miniaturized antenna and a printed circuit (not shown in the figure) which are electrically connected to each other on a surface of one of the two flexible protection layers 51;
c) covering the middle layer 53 on one of the foregoing flexible protection layers 51, such that the radio frequency identification circuit 57 is located corresponding to the hollow portion 531;
d) covering the other flexible protection layer 51 on the middle layer 53; and
e) attaching the two flexible protection layers 51 to the middle layer 53, such that a closed space 59 is formed by the means of the hollow portion 531 for receiving the radio frequency identification circuit 57.

Referring to the foregoing steps, the radio frequency identification circuit 57, the miniaturized antenna and the printed circuit (not shown in the figure) which are electrically connected to each other are formed on a surface of the bottom flexible protection layer 51 by spray printing. Further, the flexible protection layers 51 are attached to the middle layer 53 by thermal pressing technique. The subsequence steps can also include processes such as curing by cooling or testing. Alternatively, a tape middle layer can be provided with a plurality of hollow portions 531 arranged at intervals and a tape flexible protection layer 51 can be provided with an even surface before being transmitted to corresponding workstations for subsequent processes. These processes can be easily understood by those skilled in the pertinent art and thus will not be further described.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A flexible radio frequency identification label, comprising:
   a first flexible protection layer, a second flexible protection layer and a middle layer having at least one hollow portion and being interposed between the first and second flexible protection layers, the first, second and middle layers being attached to each other such that the hollow portion forms a closed space between the first flexible protection layer and the second flexible protection layer;
   a radio frequency identification circuit received in the closed space; and
   a miniaturized antenna disposed between, and covered completely by, the first flexible protection layer and middle layer and being electrically connected to the radio frequency identification circuit.

2. The flexible radio frequency identification label of claim 1, wherein the radio frequency identification circuit is a printed circuit structure formed on a surface of the closed space.

3. The flexible radio frequency identification label of claim 1, wherein the radio frequency identification circuit is a chip formed on a surface of the closed space.

4. The flexible radio frequency identification label of claim 1, wherein the miniaturized antenna is a printed circuit structure formed on an attaching surface of the first flexible protection layer.

5. The flexible radio frequency identification label of claim 1, further comprising a printed circuit for electrically connecting the radio frequency identification circuit to the miniaturized antenna.

6. The flexible radio frequency identification label of claim 1, wherein the first and second flexible protection layers are flexible substrates having dielectricity.

7. A method for fabricating a flexible radio frequency identification label, comprising the steps of:
   providing a first flexible protection layer, a second flexible protection layer, and a middle layer having at least one hollow portion on a surface thereof;
   forming a radio frequency identification circuit and a miniaturized antenna on a surface of the first flexible protection layer, wherein the radio frequency identification circuit and the miniaturized antenna are electrically connected to each other;
   applying the middle layer over the first flexible protection layer, such that the radio frequency identification circuit is located in the hollow portion;
   applying the second flexible protection layer over the middle layer; and
   attaching the first flexible protection layers the second flexible protection layer and the middle layer to each other, such that a closed space is formed by the hollow portion for receiving the radio frequency identification circuit.

8. The method of claim 7, wherein the radio frequency identification circuit and the miniaturized antenna are formed on the surface of the first flexible protection layer by spray printing.

9. The method of claim 7, wherein the first flexible protection layer, the second flexible protection layer and the middle layer are attached to each other by thermal pressing and curing.

10. The method of claim 7, wherein the middle layer is provided with a plurality of hollow portions arranged at intervals on the surface thereof.

11. The flexible radio frequency identification label of claim 1, wherein the hollow portion extends entirely through the middle layer, so that the first flexible protection layer and second flexible protection layer define a respective top and bottom of the closed space, and the middle portion defines a side of the closed space.

* * * * *